US012536944B2

(12) United States Patent
An et al.

(10) Patent No.: US 12,536,944 B2
(45) Date of Patent: Jan. 27, 2026

(54) COMPENSATION LOOKUP TABLE GENERATOR, DISPLAY APPARATUS INCLUDING THE SAME AND METHOD OF GENERATING COMPENSATION LOOKUP TABLE USING THE SAME

(71) Applicant: Samsung Display Co., Ltd., Yongin-Si (KR)

(72) Inventors: Jungeon An, Yongin-si (KR); Kihyun Pyun, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/923,676

(22) Filed: Oct. 23, 2024

(65) Prior Publication Data

US 2025/0191516 A1 Jun. 12, 2025

(30) Foreign Application Priority Data

Dec. 6, 2023 (KR) ........................ 10-2023-0175024

(51) Int. Cl.

*G09G 3/20* (2006.01)
*G06F 1/03* (2006.01)
*G09G 3/3208* (2016.01)

(52) U.S. Cl.

CPC ............. *G09G 3/2092* (2013.01); *G06F 1/03* (2013.01); *G09G 2330/021* (2013.01)

(58) Field of Classification Search

None

See application file for complete search history.

(56) References Cited

U.S. PATENT DOCUMENTS

| | | | |
|---|---|---|---|
| 10,971,065 | B2 | 4/2021 | Hong et al. |
| 11,239,286 | B2 | 2/2022 | Park et al. |
| 11,361,709 | B2 | 6/2022 | Pyun et al. |
| 11,605,331 | B2 | 3/2023 | Pyun et al. |
| 11,790,849 | B2 | 10/2023 | Pyun et al. |
| 12,020,645 | B2 | 6/2024 | Pyun et al. |

(Continued)

FOREIGN PATENT DOCUMENTS

| | | |
|---|---|---|
| CN | 116564216 A | 8/2023 |
| KR | 10-1033365 B1 | 5/2011 |

(Continued)

*Primary Examiner* — Sepehr Azari

(74) *Attorney, Agent, or Firm* — Innovation Counsel LLP

(57) ABSTRACT

A compensation lookup table generator includes a maximum power voltage determiner, a rush power reduction amount operator, an allowable current increase amount operator and a lookup table modifier. The maximum power voltage determiner is configured to determine a maximum power voltage based on a first lookup table, a peak gain setting value and a power voltage curve. The rush power reduction amount operator is configured to operate a rush power reduction amount based on the maximum power voltage and a rush power limit. The allowable current increase amount operator is configured to operate an allowable current increase amount based on the maximum power voltage and the rush power reduction amount. The lookup table modifier is configured to generate a second lookup table by modifying the first lookup table based on the peak gain setting value and the allowable current increase amount.

22 Claims, 9 Drawing Sheets

(56) References Cited

U.S. PATENT DOCUMENTS

| | | | | |
|---|---|---|---|---|
| 2009/0201231 | A1 | 8/2009 | Takahara et al. | |
| 2014/0063079 | A1* | 3/2014 | Lee | G09G 3/2003 345/77 |
| 2014/0152704 | A1 | 6/2014 | Jeong | |
| 2014/0218421 | A1* | 8/2014 | Lee | G09G 3/3208 345/77 |
| 2014/0347339 | A1 | 11/2014 | Han | |
| 2016/0155388 | A1 | 6/2016 | Baik | |
| 2019/0206364 | A1* | 7/2019 | Jeong | G09G 3/2096 |
| 2020/0143769 | A1* | 5/2020 | An | G09G 5/18 |
| 2021/0012705 | A1* | 1/2021 | Pyun | G09G 3/32 |
| 2021/0166634 | A1* | 6/2021 | Hong | G09G 3/3233 |
| 2021/0193047 | A1* | 6/2021 | Kwon | G09G 3/3258 |
| 2022/0254300 | A1* | 8/2022 | Pyun | G09G 3/32 |
| 2023/0186831 | A1* | 6/2023 | Pyun | G09G 3/3225 345/55 |
| 2023/0252944 | A1 | 8/2023 | Pyun et al. | |
| 2023/0360598 | A1* | 11/2023 | Pyun | G09G 3/20 |
| 2023/0386385 | A1 | 11/2023 | Pyun et al. | |
| 2023/0402015 | A1* | 12/2023 | Pyun | G09G 3/3266 |
| 2024/0428742 | A1* | 12/2024 | Pyun | G09G 3/3275 |
| 2025/0166563 | A1* | 5/2025 | Park | G09G 3/3233 |

FOREIGN PATENT DOCUMENTS

| | | | |
|---|---|---|---|
| KR | 10-2014-0070114 | A | 6/2014 |
| KR | 10-2016-0066585 | A | 6/2016 |
| KR | 10-2050518 | B1 | 12/2019 |
| KR | 10-2020-0030222 | A | 3/2020 |
| KR | 10-2021-0027597 | A | 3/2021 |
| KR | 10-2022-0067651 | A | 5/2022 |
| KR | 10-2022-0099169 | A | 7/2022 |
| KR | 10-2022-0134806 | A | 10/2022 |
| KR | 10-2023-0120153 | A | 8/2023 |

* cited by examiner

COMPENSATION LOOKUP TABLE GENERATOR, DISPLAY APPARATUS INCLUDING THE SAME AND METHOD OF GENERATING COMPENSATION LOOKUP TABLE USING THE SAME

PRIORITY STATEMENT

This application claims priority under 35 U.S.C. § 119 to Korean Patent Application No. 10-2023-0175024, filed on Dec. 6, 2023 in the Korean Intellectual Property Office KIPO, the contents of which are herein incorporated by reference in their entireties.

BACKGROUND

1. Field

Embodiments of the present inventive concept relate to a compensation lookup table generator, a display apparatus including the compensation lookup table and a method of generating the compensation lookup table using the compensation lookup table generator. More particularly, embodiments of the present inventive concept relate to a compensation lookup table generator increasing a luminance of a display panel by increasing a current by a rush power reduction amount which is reduced when decreasing a peak gain setting value, a display apparatus including the compensation lookup table and a method of generating the compensation lookup table using the compensation lookup table generator.

2. Description of the Related Art

Generally, a display apparatus includes a display panel and a display panel driver. The display panel includes a plurality of gate lines, a plurality of data lines and a plurality of pixels. The display panel driver includes a gate driver and a data driver. The gate driver outputs gate signals to the gate lines. The data driver outputs data voltages to the data lines. The display panel driver further includes a power voltage generator outputting a power voltage to the display panel. The display panel driver further includes a driving controller controlling an operation of the gate driver, an operation of the data driver and an operation of the power voltage generator.

The driving controller may include a net power controller determining a scale factor based on a load of input image data and a lookup table to maintain or reduce a grayscale value of the input image data.

Conventionally, the lookup table applied to the net power controller operates regardless of a peak gain setting value so that a luminance of the display panel may decrease according to the operation of the net power controller.

SUMMARY

Embodiments of the present inventive concept provide a compensation lookup table generator increasing a luminance of a display panel by increasing a current by a rush power reduction amount which is reduced when decreasing a peak gain setting value.

Embodiments of the present inventive concept also provide a display apparatus including the compensation lookup table generator.

Embodiments of the present inventive concept also provide a method of generating a compensation lookup table using the compensation lookup table generator.

In an embodiment of a compensation lookup table generator according to the present inventive concept, the compensation lookup table generator includes a maximum power voltage determiner, a rush power reduction amount operator, an allowable current increase amount operator and a lookup table modifier. The maximum power voltage determiner is configured to determine a maximum power voltage based on a first lookup table, a peak gain setting value and a power voltage curve. The rush power reduction amount operator is configured to operate a rush power reduction amount based on the maximum power voltage and a rush power limit. The allowable current increase amount operator is configured to operate an allowable current increase amount based on the maximum power voltage and the rush power reduction amount. The lookup table modifier is configured to generate a second lookup table by modifying the first lookup table based on the peak gain setting value and the allowable current increase amount.

In an embodiment, the first lookup table may include a luminance or a scale factor according to a load of input image data.

In an embodiment, the peak gain setting value is a maximum value, and the first lookup table may be the same as the second lookup table.

In an embodiment, the peak gain setting value is less than a maximum value, and a scale factor of the second lookup table may be greater than a scale factor of the first lookup table for a load greater than a scale factor maintaining load.

In an embodiment, the power voltage curve may include a power voltage according to a maximum grayscale value of input image data and a load of the input image data.

In an embodiment, as the peak gain setting value decreases, the maximum power voltage determined by the maximum power voltage generator may decrease.

In an embodiment, the rush power may be determined as a multiplication of (the rush power limit+a first current constant) and (the maximum power voltage−a first voltage constant).

In an embodiment, the peak gain setting value is a maximum value, and the rush power reduction amount operator may be configured to determine the rush power reduction amount by subtracting a rush power of the peak gain setting value from a rush power.

In an embodiment, the allowable current increase amount operator may be configured to determine the allowable current increase amount by dividing the rush power reduction amount by the maximum power voltage.

In an embodiment, the peak gain setting value is a maximum value, and the allowable current increase amount may be zero. As the peak gain setting value decreases, the allowable current increase amount may increase.

In an embodiment of a display apparatus according to the present inventive concept, the display apparatus includes a display panel and a display panel driver. The display panel driver is configured to drive the display panel. The display panel driver may include a compensation lookup table generator. The compensation lookup table generator may include a maximum power voltage determiner configured to determine a maximum power voltage based on a first lookup table, a peak gain setting value and a power voltage curve, a rush power reduction amount operator configured to operate a rush power reduction amount based on the maximum power voltage and a rush power limit, an allowable current increase amount operator configured to operate an allowable current increase amount based on the maximum power voltage and the rush power reduction amount and a lookup table modifier configured to generate a second lookup table by modifying the first lookup table based on the peak gain setting value and the allowable current increase amount.

In an embodiment, the display apparatus may further include a driving controller configured to generate compensated image data by compensating input image data based on the second lookup table and to generate a data signal based on the compensated image data and a data driver configured to convert the data signal to a data voltage and to output the data voltage to the display panel.

In an embodiment, the driving controller may include a load calculator configured to calculate a load of the input image data, a scale factor generator configured to generate a scale factor based on the load of the input image data and the second lookup table and a scale factor applier configured to apply the scale factor to the input image data to generate the compensated image data.

In an embodiment, the display panel driver may further include a load determiner configured to determine a load of the compensated image data, a maximum grayscale value determiner configured to determine a maximum grayscale value of the compensated image data, a voltage determiner configured to determine a voltage level of a power voltage based on the load of the compensated image data and the maximum grayscale value of the compensated image data and a voltage generator configured to generate the power voltage based on the voltage level.

In an embodiment, the display panel driver may further include a power voltage generator configured to generate the power voltage based on the compensated image data and to output the power voltage to the display panel. The driving controller may include the load determiner, the maximum grayscale value determiner and the voltage determiner. The power voltage generator may include the voltage generator.

In an embodiment, the display panel driver may further include a power voltage generator configured to generate the power voltage based on the compensated image data and to output the power voltage to the display panel. The driving controller may include the load determiner and the maximum grayscale value determiner. The power voltage generator may include the voltage determiner and the voltage generator.

In an embodiment, the display panel driver may further include a power voltage generator configured to generate the power voltage based on the compensated image data and to output the power voltage to the display panel. The power voltage generator may include the load determiner, the maximum grayscale value determiner, the voltage determiner and the voltage generator.

In an embodiment, the display apparatus may further include a lookup table setter configured to output the first lookup table and the peak gain setting value to the maximum power voltage determiner and the lookup table modifier.

In an embodiment, the display apparatus may further include a power voltage curve setter configured to output the power voltage curve to the maximum power voltage determiner.

In an embodiment, the peak gain setting value is a maximum value, and the first lookup table may be the same as the second lookup table.

In an embodiment, the peak gain setting value is less than a maximum value, and a scale factor of the second lookup table may be greater than a scale factor of the first lookup table for a load greater than a scale factor maintaining load.

In an embodiment of a method of generating a compensation lookup table according to the present inventive concept, the method includes determining a maximum power voltage based on a first lookup table, a peak gain setting value and a power voltage curve, operating a rush power reduction amount based on the maximum power voltage and a rush power limit, operating an allowable current increase amount based on the maximum power voltage and the rush power reduction amount and generating a second lookup table by modifying the first lookup table based on the peak gain setting value and the allowable current increase amount.

According to the compensation lookup table generator, the display apparatus including the compensation lookup table generator and the method of generating the compensation lookup table using the compensation lookup table generator, the compensation lookup table generator may determine the decrease of the maximum power voltage and the rush power reduction amount when the peak gain setting value is decreased. The compensation lookup table generator may determine the allowable current increase amount corresponding to the rush power reduction amount. The compensation lookup table generator may generate the second lookup table by modifying the first lookup table based on the peak gain setting value and the allowable current increase amount.

The compensation lookup table generator increases the luminance of the display panel by increasing the current by the rush power reduction amount which is reduced when decreasing the peak gain setting value. Thus, the display quality of the display panel may be enhanced.

BRIEF DESCRIPTION OF THE DRAWINGS

The above and other features and advantages of the present inventive concept will become more apparent by describing in detailed embodiments thereof with reference to the accompanying drawings.

DETAILED DESCRIPTION OF THE INVENTIVE CONCEPT

Hereinafter, the present inventive concept will be explained in detail with reference to the accompanying drawings.

Figure 1:
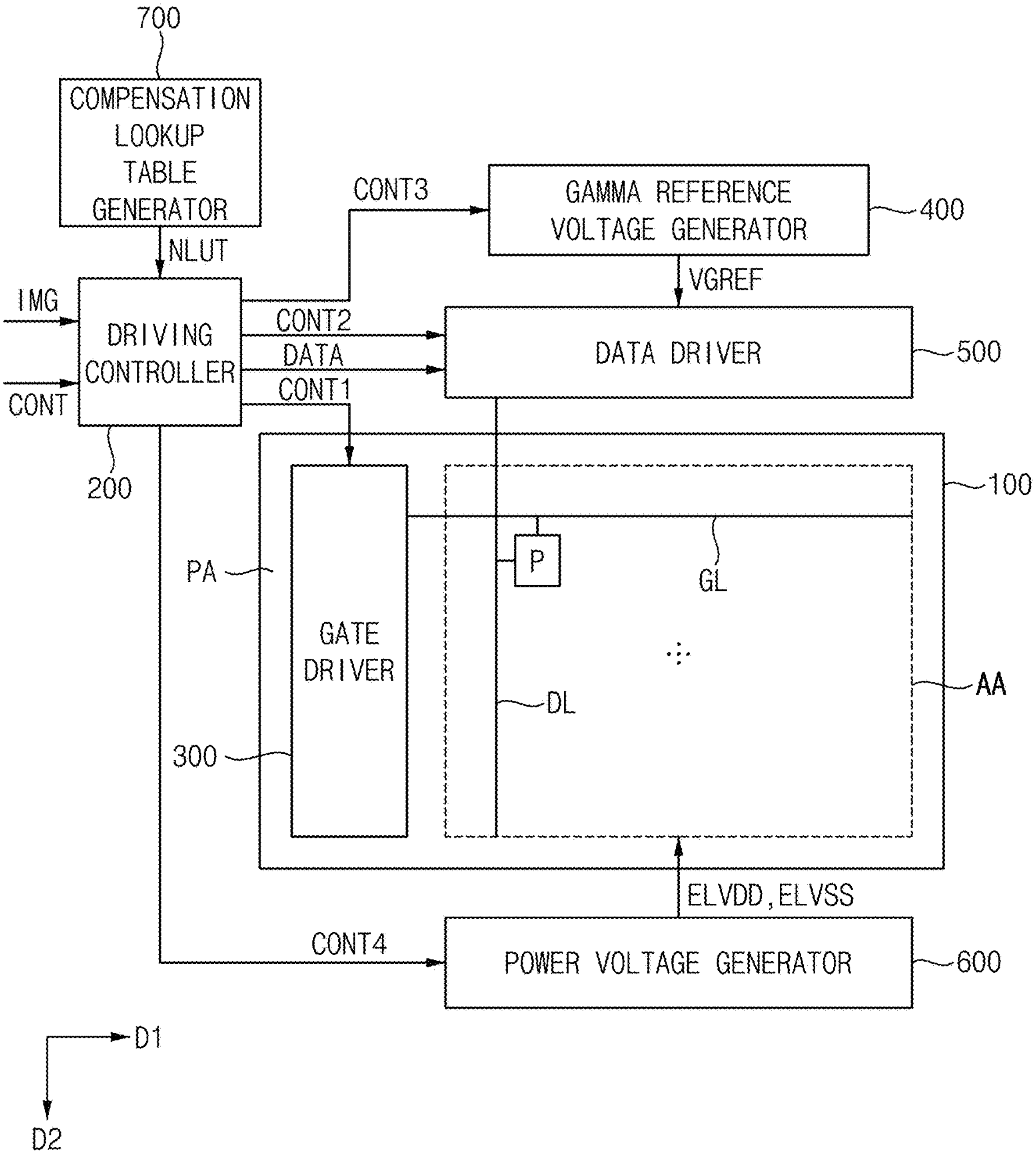
FIG. 1 is a block diagram illustrating a display apparatus according to an embodiment of the present inventive concept.

FIG. 1 is a block diagram illustrating a display apparatus according to an embodiment of the present inventive concept.

Referring to FIG. 1, the display apparatus includes a display panel 100 and a display panel driver. The display panel driver includes a driving controller 200, a gate driver 300, a gamma reference voltage generator 400 and a data driver 500. The display panel driver may further include a power voltage generator 600. The display panel driver may further include a compensation lookup table generator 700.

For example, the driving controller 200 and the data driver 500 may be integrally formed. For example, the driving controller 200, the gamma reference voltage generator 400 and the data driver 500 may be integrally formed. For example, the driving controller 200, the gamma reference voltage generator 400, the data driver 500 and the power voltage generator 600 may be integrally formed. A driving module including at least the driving controller 200 and the data driver 500 which are integrally formed may be called a timing controller embedded data driver (TED).

The display panel 100 has a display region AA on which an image is displayed and a peripheral region PA adjacent to the display region AA.

For example, in the present embodiment, the display panel 100 may be an organic light emitting diode display panel including an organic light emitting diode. For example, the display panel 100 may be a quantum dot organic light emitting diode display panel including an organic light emitting diode and a quantum dot color filter. For example, the display panel 100 may be a quantum dot nano light emitting diode display panel including a nano light emitting diode and a quantum dot color filter.

The display panel 100 includes a plurality of gate lines GL, a plurality of data lines DL and a plurality of pixels P connected to the gate lines GL and the data lines DL. The gate lines GL extend in a first direction D1 and the data lines DL extend in a second direction D2 crossing the first direction D1.

The driving controller 200 may receive input image data IMG and an input control signal CONT from an external apparatus (e.g. a host or an application processor). The input image data IMG may include red image data, green image data and blue image data. The input image data IMG may include white image data. The input image data IMG may include magenta image data, yellow image data and cyan image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3 and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may further include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT, and outputs the third control signal CONT3 to the gamma reference voltage generator 400.

The driving controller 200 may generate a fourth control signal CONT4 for controlling an operation of the power voltage generator 600 based on the input image data IMG and the input control signal CONT, and outputs the fourth control signal CONT4 to the power voltage generator 600. The fourth control signal CONT4 may include a power voltage level signal to determining a level of a power voltage.

The gate driver 300 generates gate signals driving the gate lines GL in response to the first control signal CONT1 received from the driving controller 200. The gate driver 300 outputs the gate signals to the gate lines GL. For example, the gate driver 300 may sequentially output the gate signals to the gate lines GL.

In an embodiment, the gate driver 300 may be integrated on the peripheral region PA of the display panel 100.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF is used to convert the data signal DATA to the data voltage having an analog type.

In an embodiment, the gamma reference voltage generator 400 may be disposed in the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages having an analog type using the gamma reference voltages VGREF. The data driver 500 outputs the data voltages to the data lines DL.

The power voltage generator 600 may generate a power voltage ELVDD and output the power voltage ELVDD to the display panel 100. The power voltage generator 600 may generate a low power voltage ELVSS and output the low power voltage ELVSS to the display panel 100. In addition, the power voltage generator 600 may generate a gate driving voltage for driving the gate driver 300 and output the gate driving voltage to the gate driver 300. In addition, the power voltage generator 600 may generate a data driving voltage for driving the data driver 500 and output the data driving voltage to the data driver 500. For example, the power voltage ELVDD may be a high power voltage applied to the pixel of the display panel 100 and the low power voltage ELVSS may be a low power voltage applied to the pixel of the display panel 100.

The compensation lookup table generator 700 may provide a compensation lookup table NLUT, sometimes called a second lookup table NLUT, to the driving controller 200.

The driving controller 200 may determine a scale factor based on a load of the input image data IMG and the compensation lookup table NLUT and may operate a net power control operation maintaining or reducing a grayscale value of the input image data IMG. When the load of the input image data IMG is greater than a net power control limit, the load or the grayscale value of the input image data IMG may be reduced by multiplying the scale factor to the load or the grayscale value of the input image data IMG. When the load of the input image data IMG is not greater than the net power control limit, the load or the grayscale value of the input image data IMG may be maintained.

Figure 2:
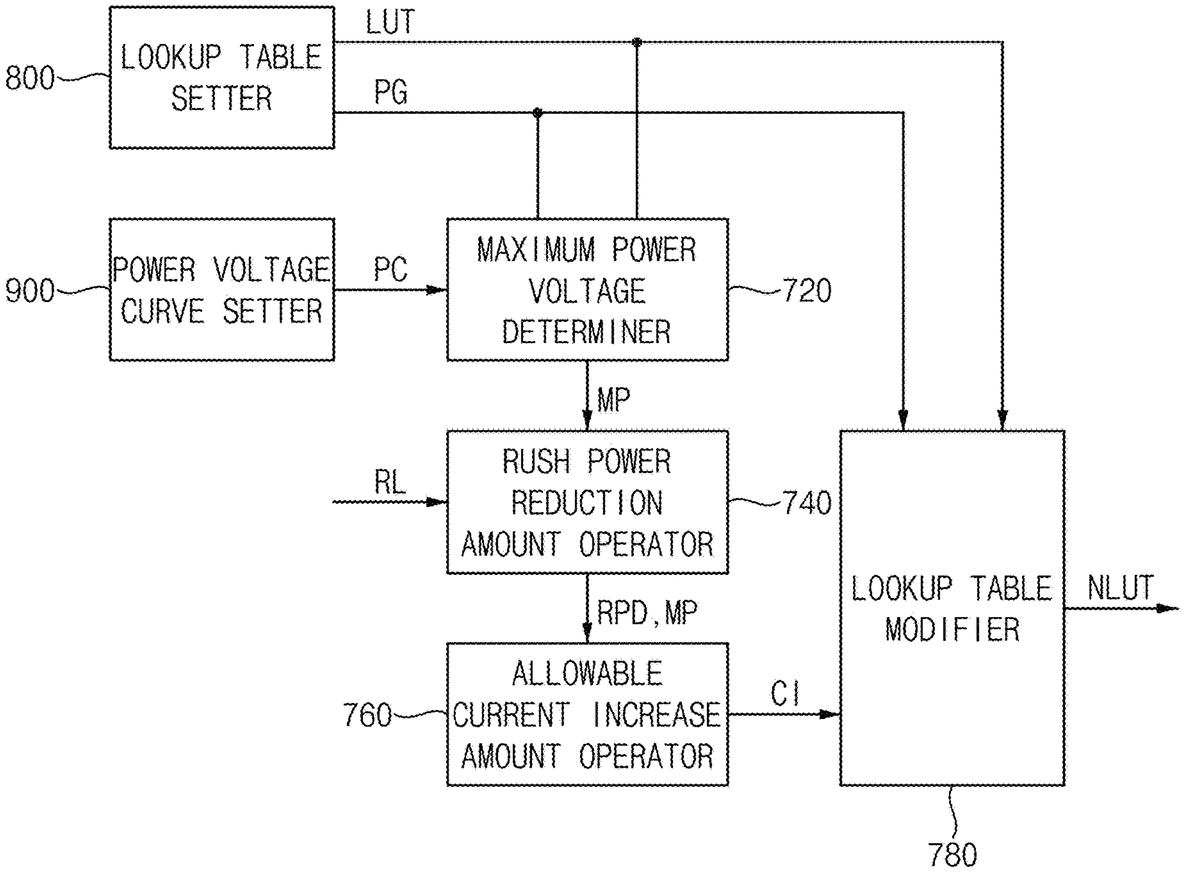
FIG. 2 is a block diagram illustrating a compensation lookup table generator of FIG. 1.
Figure 3:
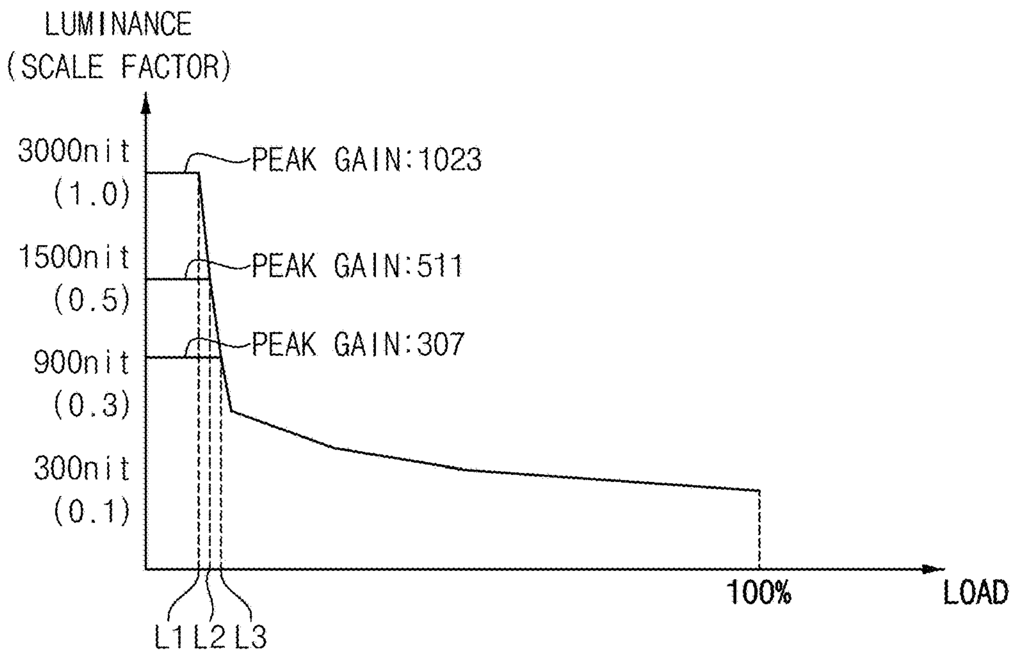
FIG. 3 is a graph illustrating a luminance and a scale factor according to a load and a peak gain setting value.
Figure 4:
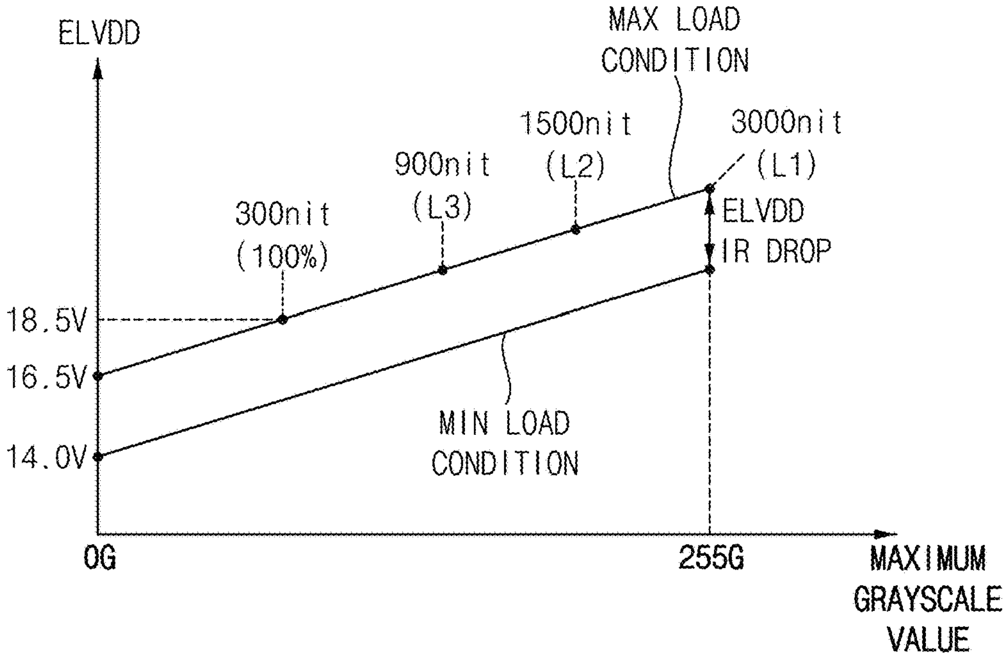
FIG. 4 is a graph illustrating a level of a power voltage according to a grayscale value and the load.
Figure 5:
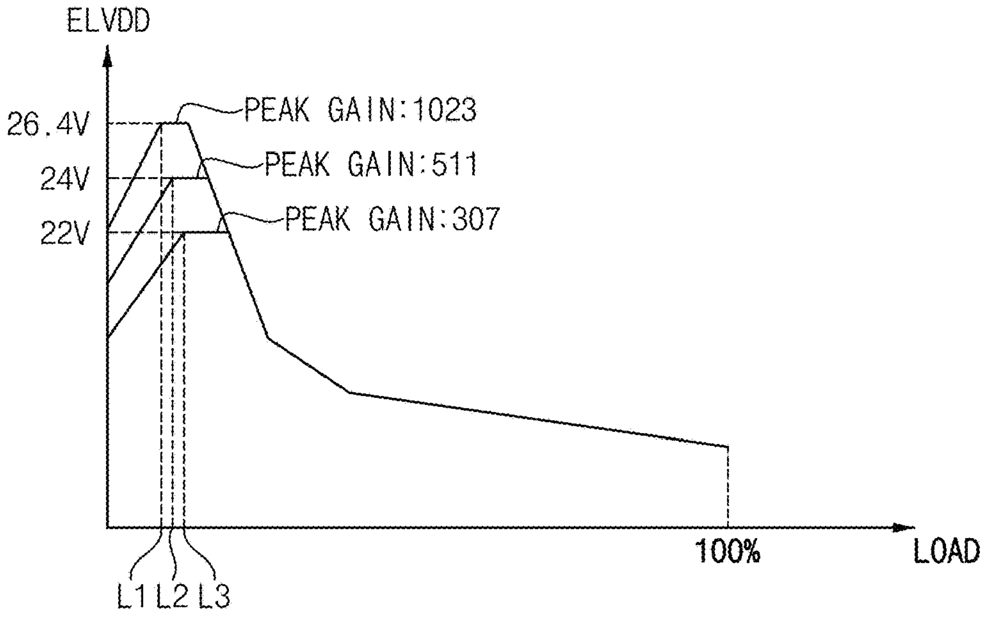
FIG. 5 is a graph illustrating a maximum value of the power voltage according to the load.
Figure 6:
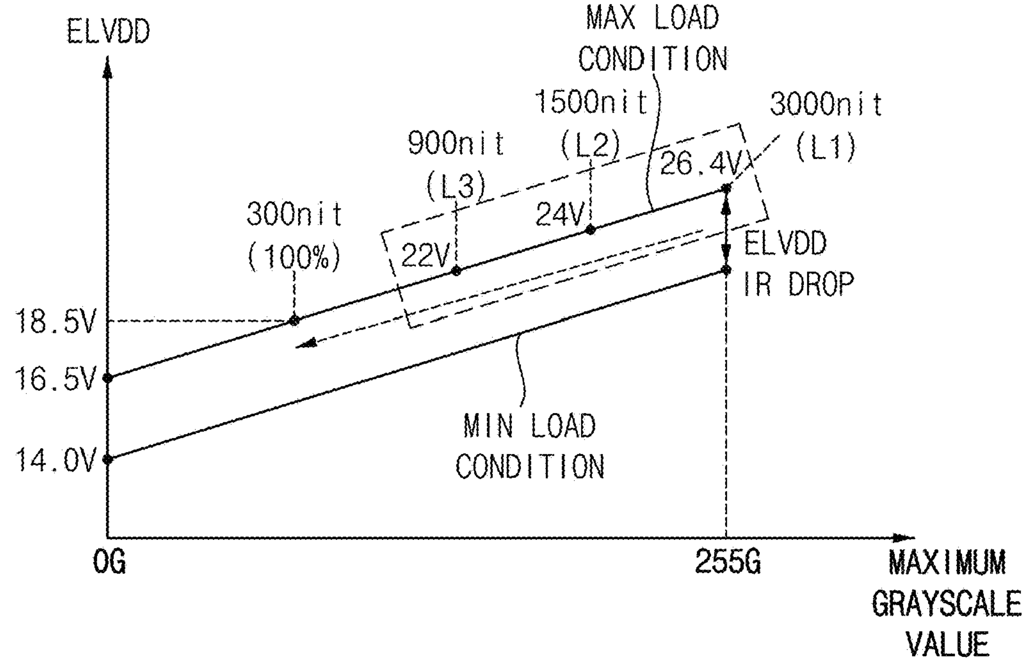
FIG. 6 is a graph illustrating an operation of a maximum power voltage determiner of FIG. 2.
Figure 7:
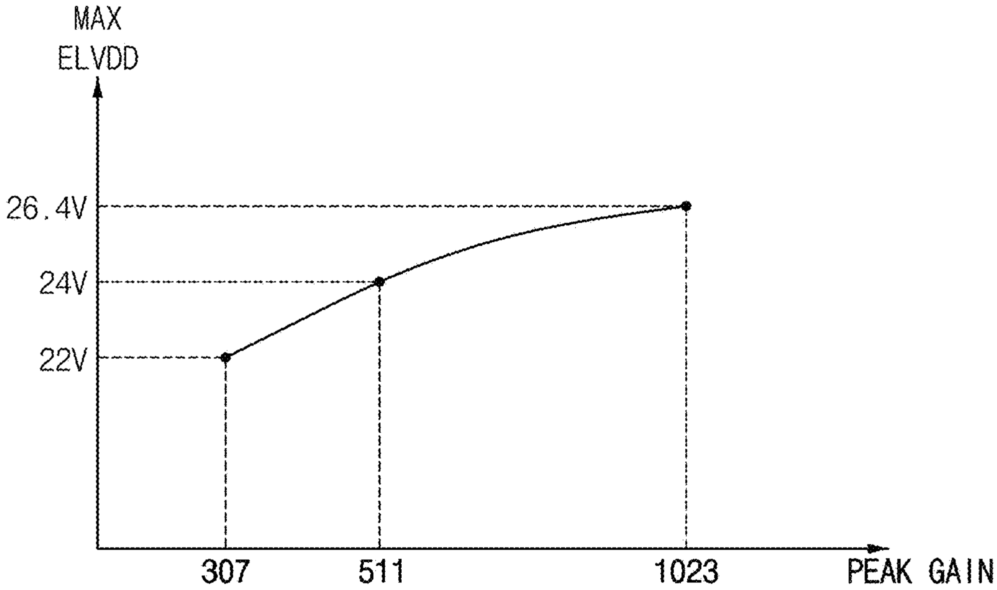
FIG. 7 is a graph illustrating an operation of the maximum power voltage determiner of FIG. 2.
Figure 8:
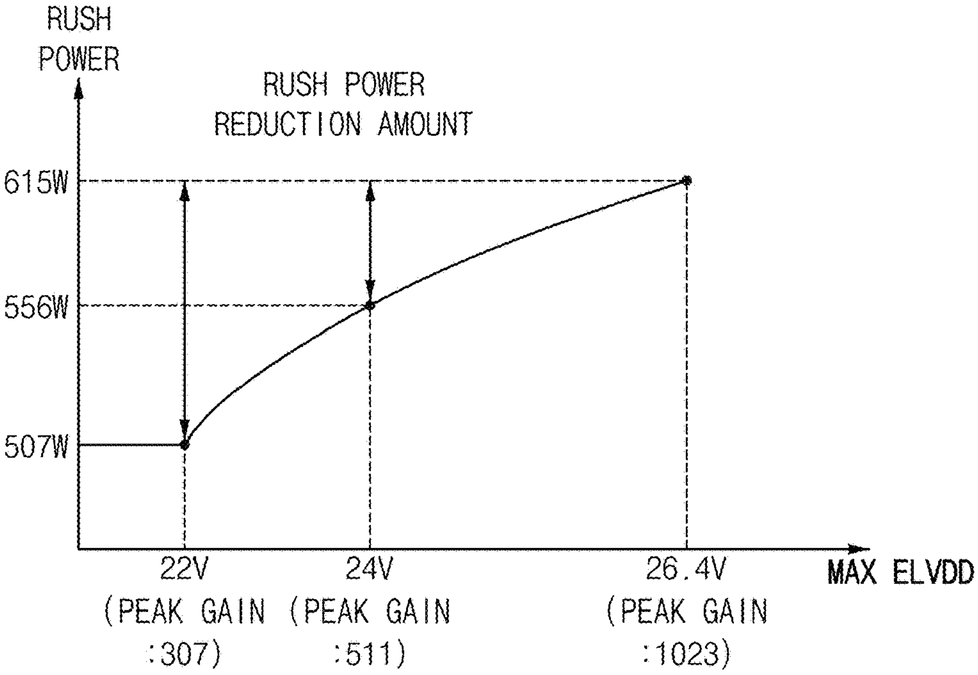
FIG. 8 is a graph illustrating an operation of a rush power reduction amount operator of FIG. 2.
Figure 9:
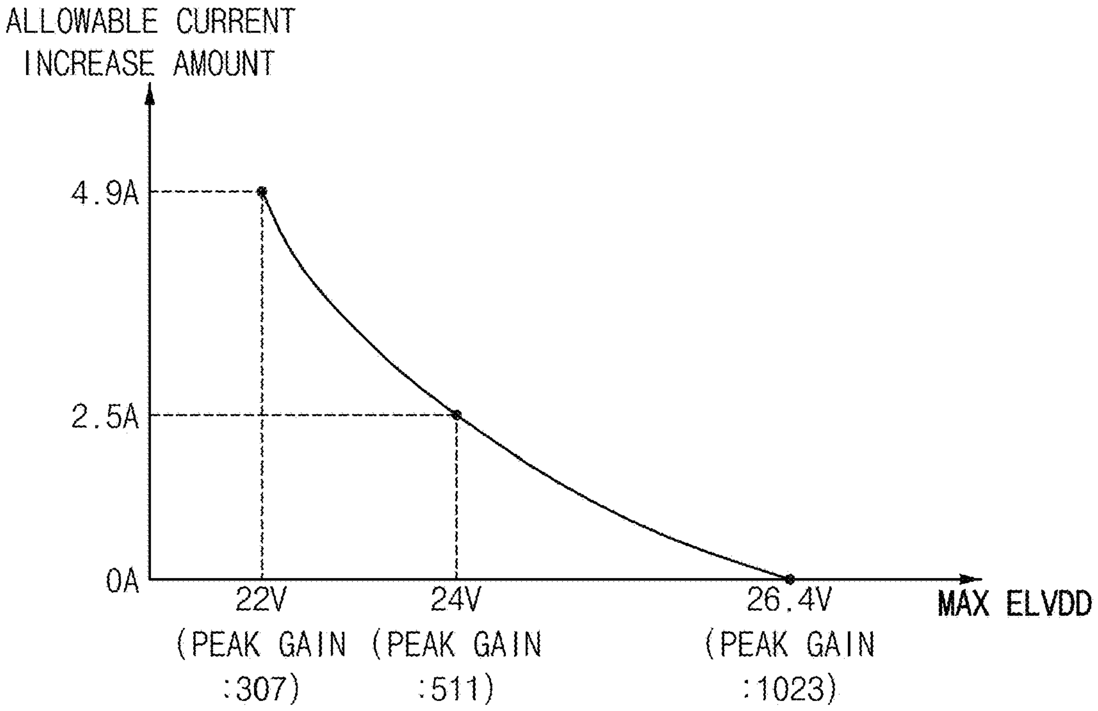
FIG. 9 is a graph illustrating an operation of an allowable current increase amount operator of FIG. 2.
Figure 10:
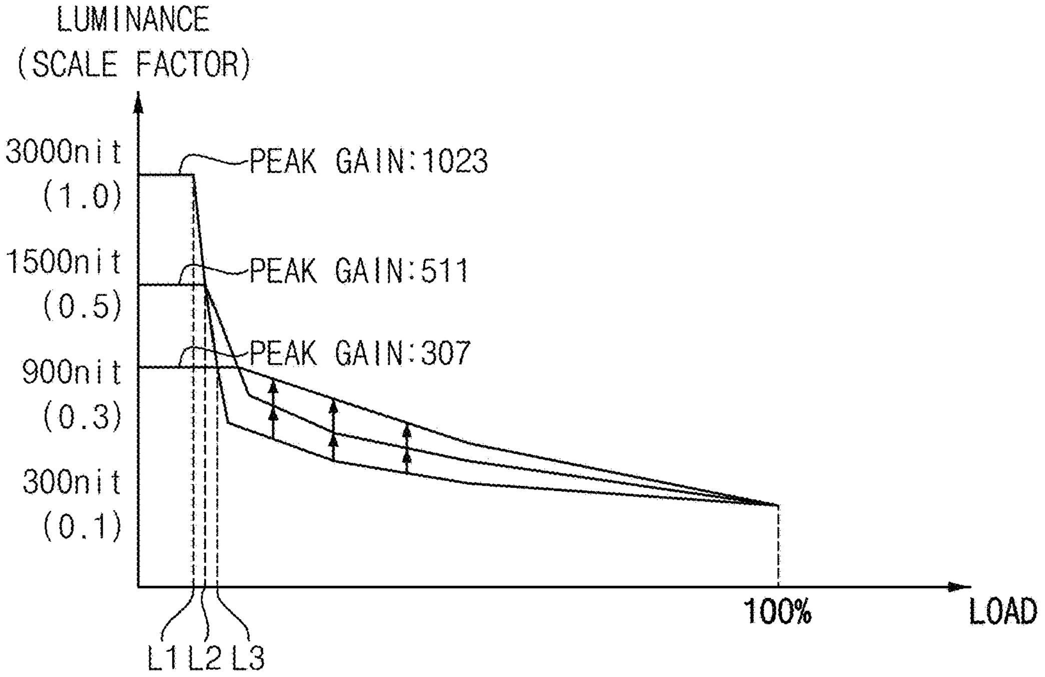
FIG. 10 is a graph illustrating an operation of a lookup table modifier of FIG. 2.

FIG. 2 is a block diagram illustrating the compensation lookup table generator 700 of FIG. 1. FIG. 3 is a graph illustrating a luminance and a scale factor according to the load and a peak gain setting value PG. FIG. 4 is a graph illustrating a level of a power voltage ELVDD according to a grayscale value and the load. FIG. 5 is a graph illustrating a maximum value MAX ELVDD of the power voltage according to the load. FIG. 6 is a graph illustrating an operation of a maximum power voltage determiner 720 of FIG. 2. FIG. 7 is a graph illustrating an operation of the maximum power voltage determiner 720 of FIG. 2. FIG. 8 is a graph illustrating an operation of a rush power reduction amount operator 740 of FIG. 2. FIG. 9 is a graph illustrating an operation of an allowable current increase amount operator 760 of FIG. 2. FIG. 10 is a graph illustrating an operation of a lookup table modifier 780 of FIG. 2.

Referring to FIGS. 1 to 10, the display panel driver includes the compensation lookup table generator 700. The compensation lookup table generator 700 includes a maximum power voltage determiner 720, a rush power reduction amount operator 740, an allowable current increase amount operator 760 and a lookup table modifier 780.

The maximum power voltage determiner 720 determines a maximum power voltage MP based on a first lookup table LUT, a peak gain setting value PG and a power voltage curve PC. The rush power reduction amount operator 740 operates a rush power reduction amount RPD based on the maximum power voltage MP and a rush power limit RL. The allowable current increase amount operator 760 operates an allowable current increase amount CI based on the maximum power voltage MP and the rush power reduction amount RPD. The lookup table modifier 780 generates the second lookup table NLUT by modifying the first lookup table LUT based on the peak gain setting value PG and the allowable current increase amount CI.

The display apparatus may further include a lookup table setter 800 outputting the first lookup table LUT and the peak gain setting value PG to the maximum power voltage determiner 720 and the lookup table modifier 780. The display apparatus may further include a power voltage curve setter 900 outputting the power voltage curve PC to the maximum power voltage determiner 720.

As shown in FIG. 3, the first lookup table LUT may include a luminance or a scale factor according to the load of the input image data IMG. The first lookup table LUT may be a net power control lookup table for a net power control operation. For example, when the input image data IMG of a frame is full-white, the load of the input image data IMG may be 100%. When the input image data IMG of the frame is full-white and the display panel 100 outputs an image in a maximum luminance of 3000 nit, the display panel driver may be damaged or a fire may occur in the display panel driver. Thus, when the load of the input image data IMG is great, the luminance or the grayscale value of the input image data IMG may be reduced by applying the scale factor to the luminance or the grayscale value of the input image data IMG. The scale factor may be applied to the input image data IMG in a luminance domain or in a grayscale value domain.

When the scale factor is determined to 0.5, the input image of 3000 nit may be changed to an image of 1500 nit. When the scale factor is determined to 0.3, the input image of 3000 nit may be changed to an image of 900 nit. When the scale factor is determined to 0.1, the input image of 3000 nit may be changed to an image of 300 nit.

The lookup table LUT of FIG. 3 may be determined by a lookup table setting value and a peak gain setting value. The lookup table setting value may determine a maximum luminance (e.g. 3000 nit) of the lookup table of FIG. 3 and determine how much loads maintain the maximum luminance. The peak gain setting value may clamp the luminance or the scale factor at an upper portion of the lookup table determined by the lookup table setting value.

In FIG. 3, “PEAK GAIN: 1023” indicates a maximum value of the peak gain setting value. For “PEAK GAIN: 1023,” the maximum luminance of the lookup table may be 3000 nit and a maximum scale factor may be 1.0.

In FIG. 3, “PEAK GAIN: 511” indicates a case in which the luminance or the scale factor at the upper portion is limited to 50%. For “PEAK GAIN: 511,” the maximum luminance of the lookup table may be 1500 nit and the maximum scale factor may be 0.5.

In FIG. 3, “PEAK GAIN: 307” indicates a case in which the luminance or the scale factor at the upper portion is limited to 30%. For “PEAK GAIN: 307,” the maximum luminance of the lookup table may be 900 nit and the maximum scale factor may be 0.3.

A scale factor maintaining load L1 in FIG. 3 represents the scale factor maintaining load in which the maximum luminance (e.g. 3000 nit) or the maximum grayscale factor (e.g. 1.0) of the lookup table is maintained in the condition of “PEAK GAIN: 1023.”

A scale factor maintaining load L2 in FIG. 3 represents the scale factor maintaining load in which the maximum luminance (e.g. 1500 nit) or the maximum grayscale factor (e.g. 0.5) of the lookup table is maintained in the condition of “PEAK GAIN: 511.”

A scale factor maintaining load L3 in FIG. 3 represents the scale factor maintaining load in which the maximum luminance (e.g. 900 nit) or the maximum grayscale factor (e.g. 0.3) of the lookup table is maintained in the condition of “PEAK GAIN: 307.”

The maximum luminance or the maximum scale factor may be reduced (from 3000 nit to 900 nit or from 1.0 to 0.3) and the scale factor maintaining load may be increased from the scale factor maintaining load L1 to L3 as the peak gain setting value decreases in a condition that values in the lookup table are already fixed. For example, the scale factor maintaining load L1 may be 3%, the scale factor maintaining load L2 may be 5% and the scale factor maintaining load L3 may be 7% in FIG. 3.

FIG. 4 illustrates the power voltage curve PC. The power voltage curve PC may include a power voltage ELVDD according to the maximum grayscale value of the input image data IMG and the load of the input image data IMG.

In the power voltage curve PC, the power voltage ELVDD may increase as the maximum grayscale value increases. In the power voltage curve PC, the power voltage ELVDD may increase as the load of the input image data IMG increases. The power voltage ELVDD may be varied according to the load of the input image data IMG considering IR drop of the power voltage ELVDD.

A graph of FIG. 5 illustrates the power voltage ELVDD according to the load of the input image data IMG. As the load increases, the power voltage ELVDD may increase prior to the scale factor maintaining load L1, L2 and L3. In contrast, as the load increases, the power voltage ELVDD may decrease after the scale factor maintaining load L1, L2 and L3.

Referring to FIG. 6, the maximum power voltage generator 720 determines a maximum power voltage MP based on the first lookup table LUT, the peak gain setting value PG and the power voltage curve PC.

As the peak gain setting value PG decreases, the maximum power voltage MP determined by the maximum power voltage generator 720 may decrease. The maximum power voltage generator 720 may extract the maximum power voltage MP of a maximum load condition according to the maximum grayscale value from the power voltage curve PC.

As shown in FIGS. 6 and 7, for example, when the peak gain setting value PG is 1023, the maximum power voltage MP of 26.4V may be extracted for the scale factor maintaining load L1. For example, when the peak gain setting value PG is 511, the maximum power voltage MP of 24V may be extracted for the scale factor maintaining load L2. For example, when the peak gain setting value PG is 307, the maximum power voltage MP of 22V may be extracted for the scale factor maintaining load L3. Herein, 26.4V, 24V and 22V are example levels so that the present inventive concept may not be limited to the levels of the maximum power voltage MP.

When the peak gain setting value PG decreases and the maximum power voltage MP (MAX ELVDD) decreases, a rush power may be decreased. The rush power may be increased when the maximum power voltage MP (MAX ELVDD) increases. The rush power may be determined as a multiplication of (the rush power limit+a first current constant) and (the maximum power voltage−a first voltage constant). Herein, the first current constant may be a dead zone current. The first voltage constant may be a load regulation voltage of the power voltage ELVDD. Herein, the rush power limit may represent an allowable value of a sensed current. When the current suddenly increases and reaches the rush power limit, the display panel driver may immediately reduce the level of the power voltage ELVDD.

As shown in FIG. 8, the rush power reduction amount operator 740 may determine the rush power reduction amount RPD (e.g. 59 W and 108 W) by subtracting the rush power (e.g. 556 W and 507 W) of the peak gain setting value PG from the rush power (e.g. 615 W) when the peak gain setting value PG is the maximum value. Herein, the rush power limit may be 20 A, the dead zone current may be 4.6 A and the load regulation voltage may be 1.4V.

The allowable current increase amount CI may correspond to the rush power reduction amount RPD. For example, the allowable current increase amount operator 760 may determine the allowable current increase amount CI by dividing the rush power reduction amount RPD by the maximum power voltage MP.

When the peak gain setting value PG is the maximum, the allowable current increase amount CI may be zero. As the peak gain setting value PG decreases, the allowable current increase amount CI may increase. For example, in the condition of "PEAK GAIN: 1023," the rush power reduction amount RPD may be OW and the allowable current increase amount CI may be 0 A. For example, in the condition of "PEAK GAIN: 511," the rush power reduction amount RPD may be 59 W and the allowable current increase amount CI may be 2.5 A. For example, in the condition of "PEAK GAIN: 307," the rush power reduction amount RPD may be 108 W and the allowable current increase amount CI may be 4.9 A.

The lookup table modifier 780 may generate the second lookup table NLUT by modifying the first lookup table LUT based on the peak gain setting value PG and the allowable current increase amount CI.

As shown in FIGS. 3 and 10, when the peak gain setting value is the maximum (PEAK GAIN: 1023), the first lookup table LUT may be the same as the second lookup table NLUT.

As shown in FIGS. 3 and 10, when the peak gain setting value is less than the maximum (PEAK GAIN: 1023), the scale factor of the second lookup table NLUT may be greater than the scale factor of the first lookup table LUT for the load greater than the scale factor maintaining load L2 and L3. For example, when the peak gain setting value PG decreases and the maximum power voltage MP decreases, the rush power may be reduced and the rush power reduction amount RPD may be generated. When the rush power is reduced, the allowable current increase amount CI may be operated corresponding to the rush power reduction amount RPD so that the luminance of the display panel 100 may be increased corresponding to the allowable current increase amount CI.

Figure 11:
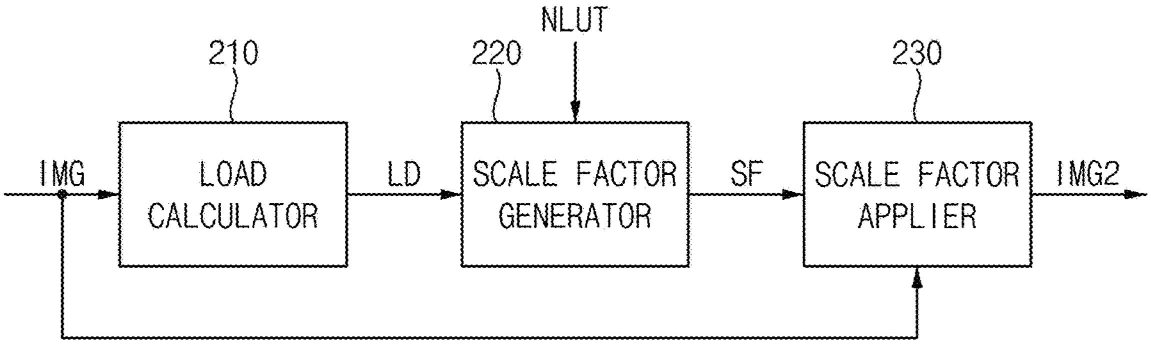
FIG. 11 is a block diagram illustrating a driving controller of FIG. 1.
Figure 12:
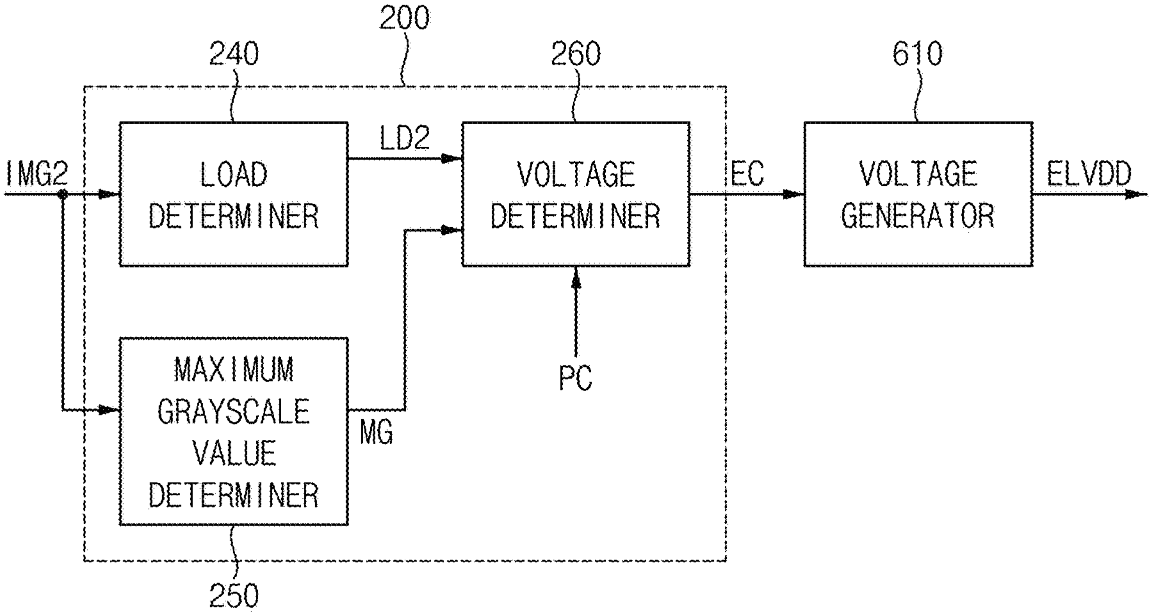
FIG. 12 is a block diagram illustrating the driving controller and a power voltage generator of FIG. 1.

FIG. 11 is a block diagram illustrating a driving controller 200 of FIG. 1. FIG. 12 is a block diagram illustrating the driving controller 200 and a power voltage generator 600 of FIG. 1.

Referring to FIGS. 1 to 12, the display panel driver may include the driving controller 200 generating compensated image data IMG2 by compensating the input image data IMG based on the second lookup table NLUT and generating the data signal DATA based on the compensated image data IMG2 and the data driver 500 converting the data signal DATA to the data voltage and outputting the data voltage to the display panel 100.

In addition, the display panel driver may include the power voltage generator 600 generating the power voltage ELVDD based on the compensated image data IMG2 and outputting the power voltage ELVDD to the display panel 100.

The driving controller 200 may include the net power controller. The net power controller may include a load calculator 210 calculating the load LD of the input image data IMG, a scale factor generator 220 generating the scale factor SF based on the load LD of the input image data IMG and the second lookup table NLUT and a scale factor applier 230 applying the scale factor SF to the input image data IMG to generate the compensated image data IMG2.

The load calculator 210 may receive the input image data IMG. The load calculator 210 may calculate the load LD of the input image data IMG based on the grayscale value of the input image data IMG. The load calculator 210 may calculate the load LD of the input image data IMG in every frame.

The scale factor generator 220 may receive the load LD. The scale factor generator 220 may generate the scale factor SF based on the load D and the second lookup table NLUT.

The scale factor applier 230 may apply the scale factor SF to the input image data IMG to generate the compensated image data IMG2. For example, the scale factor SF may be equal to or greater than zero and equal to or less than one. When the scale factor SF is 0.5, the grayscale value or the luminance of the compensated image data IMG2 may be a half of the grayscale value or the luminance of the input image data IMG.

The display panel driver may further include a load determiner 240 determining a load LD2 of the compensated image data IMG2, a maximum grayscale value determiner 250 determining the maximum grayscale value MG of the compensated image data IMG2, a voltage determiner 260 determining a voltage level EC of the power voltage ELVDD based on the load LD2 of the compensated image data IMG2 and the maximum grayscale value MG of the compensated image data IMG2 and a voltage generator 610 generating the power voltage ELVDD based on the voltage level EC.

In the present embodiment, the driving controller 200 may include the load determiner 240, the maximum grayscale value determiner 250 and the voltage determiner 260. The power voltage generator 600 may include the voltage generator 610.

According to the present embodiment, the compensation lookup table generator 700 may determine the decrease of the maximum power voltage MP and the rush power reduction amount RPD when the peak gain setting value PG is decreased. The compensation lookup table generator 700 may determine the allowable current increase amount CI corresponding to the rush power reduction amount RPD. The compensation lookup table generator 700 may generate the second lookup table NLUT by modifying the first lookup table LUT based on the peak gain setting value PG and the allowable current increase amount CI.

The compensation lookup table generator 700 increases the luminance of the display panel 100 by increasing the current by the rush power reduction amount RPD which is reduced when decreasing the peak gain setting value PG. Thus, the display quality of the display panel 100 may be enhanced.

Figure 13:
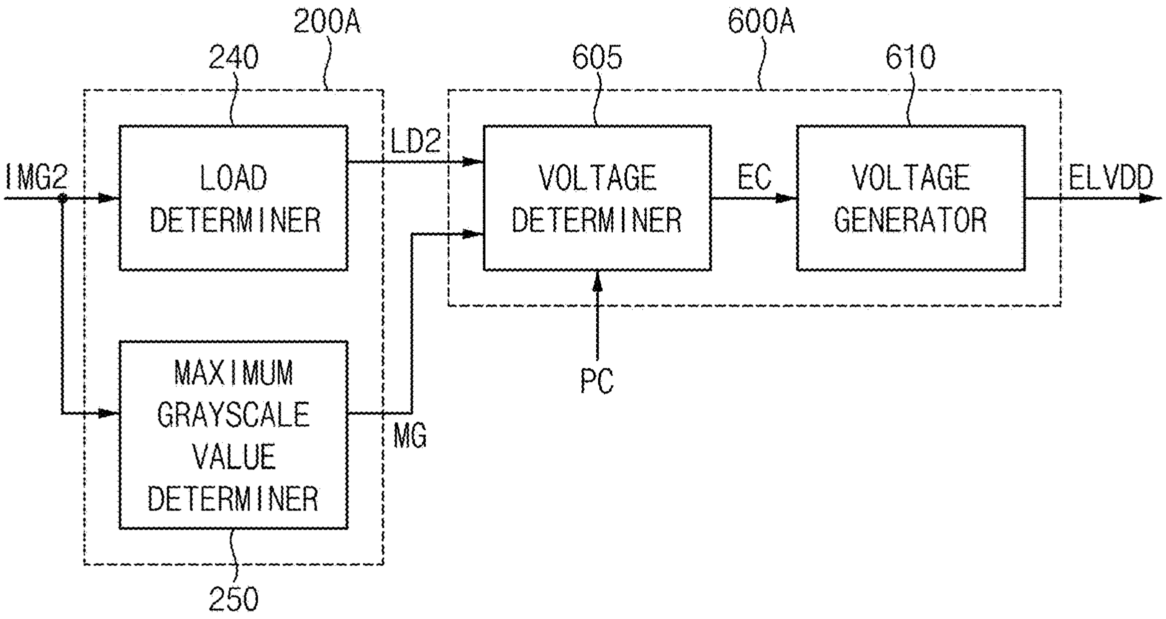
FIG. 13 is a block diagram illustrating a driving controller and a power voltage generator of a display apparatus according to an embodiment of the present inventive concept.

FIG. 13 is a block diagram illustrating a driving controller and a power voltage generator of a display apparatus according to an embodiment of the present inventive concept.

The display apparatus and the method of driving the display apparatus according to the present embodiment are substantially the same as the display apparatus and the method of driving the display apparatus of the previous embodiment explained referring to FIGS. 1 to 12 except for the structure of the driving controller and the structure of the power voltage generator. Thus, the same reference numerals will be used to refer to the same or like parts as those described in the previous embodiment of FIGS. 1 to 12 and any repetitive explanation concerning the above elements will be omitted.

Referring to FIG. 13, the display panel driver may further include a load determiner 240 determining a load LD2 of the compensated image data IMG2, a maximum grayscale value determiner 250 determining the maximum grayscale value MG of the compensated image data IMG2, a voltage determiner 605 determining a voltage level EC of the power voltage ELVDD based on the load LD2 of the compensated image data IMG2 and the maximum grayscale value MG of the compensated image data IMG2 and a voltage generator 610 generating the power voltage ELVDD based on the voltage level EC.

In the present embodiment, a driving controller 200A may include the load determiner 240 and the maximum grayscale value determiner 250. A power voltage generator 600A may include the voltage determiner 605 and the voltage generator 610.

According to the present embodiment, the compensation lookup table generator 700 may determine the decrease of the maximum power voltage MP and the rush power reduction amount RPD when the peak gain setting value PG is decreased. The compensation lookup table generator 700 may determine the allowable current increase amount CI corresponding to the rush power reduction amount RPD. The compensation lookup table generator 700 may generate the second lookup table NLUT by modifying the first lookup table LUT based on the peak gain setting value PG and the allowable current increase amount CI.

The compensation lookup table generator 700 increases the luminance of the display panel 100 by increasing the current by the rush power reduction amount RPD which is reduced when decreasing the peak gain setting value PG. Thus, the display quality of the display panel 100 may be enhanced.

Figure 14:
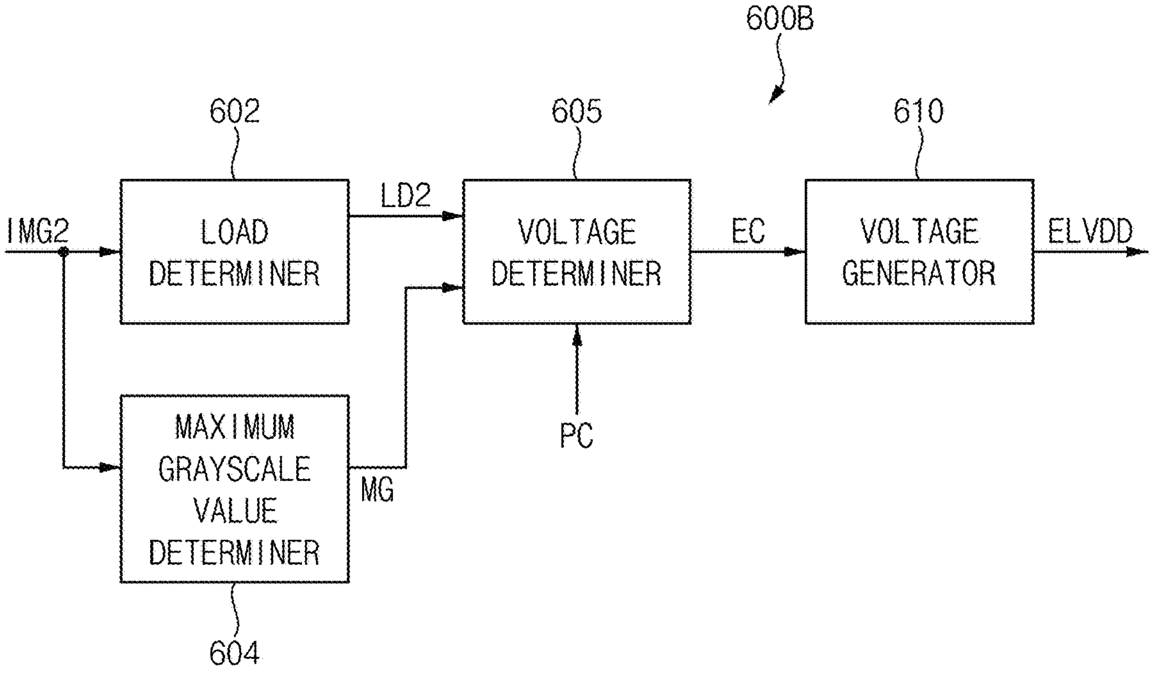
FIG. 14 is a block diagram illustrating a power voltage generator of a display apparatus according to an embodiment of the present inventive concept.

FIG. 14 is a block diagram illustrating a power voltage generator of a display apparatus according to an embodiment of the present inventive concept.

The display apparatus and the method of driving the display apparatus according to the present embodiment are substantially the same as the display apparatus and the method of driving the display apparatus of the previous embodiment explained referring to FIGS. 1 to 12 except for the structure of the driving controller and the structure of the power voltage generator. Thus, the same reference numerals will be used to refer to the same or like parts as those described in the previous embodiment of FIGS. 1 to 12 and any repetitive explanation concerning the above elements will be omitted.

Referring to FIG. 14, the display panel driver may further include a load determiner 602 determining a load LD2 of the compensated image data IMG2, a maximum grayscale value determiner 604 determining the maximum grayscale value MG of the compensated image data IMG2, a voltage determiner 605 determining a voltage level EC of the power voltage ELVDD based on the load LD2 of the compensated image data IMG2 and the maximum grayscale value MG of the compensated image data IMG2 and a voltage generator 610 generating the power voltage ELVDD based on the voltage level EC.

In the present embodiment, a power voltage generator 600B may include the load determiner 602, the maximum grayscale value determiner 604, the voltage determiner 605 and the voltage generator 610.

According to the present embodiment, the compensation lookup table generator 700 may determine the decrease of the maximum power voltage MP and the rush power reduction amount RPD when the peak gain setting value PG is decreased. The compensation lookup table generator 700 may determine the allowable current increase amount CI corresponding to the rush power reduction amount RPD. The compensation lookup table generator 700 may generate the second lookup table NLUT by modifying the first lookup table LUT based on the peak gain setting value PG and the allowable current increase amount CI.

The compensation lookup table generator 700 increases the luminance of the display panel 100 by increasing the current by the rush power reduction amount RPD which is reduced when decreasing the peak gain setting value PG. Thus, the display quality of the display panel 100 may be enhanced.

Figure 15:
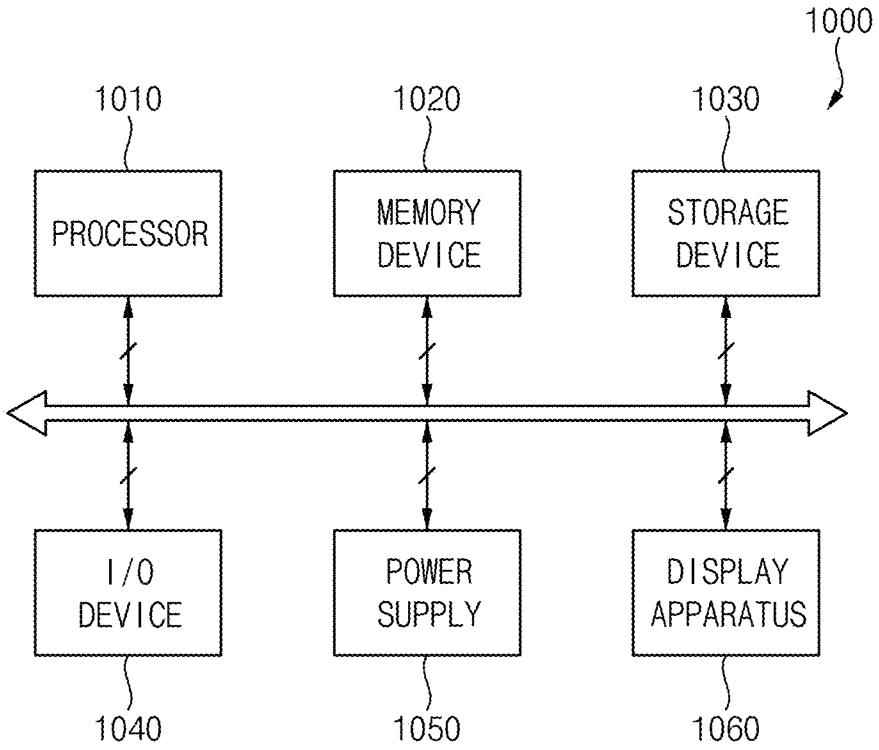
FIG. 15 is a block diagram illustrating an electronic apparatus according to an embodiment of the present inventive concept.
Figure 16:
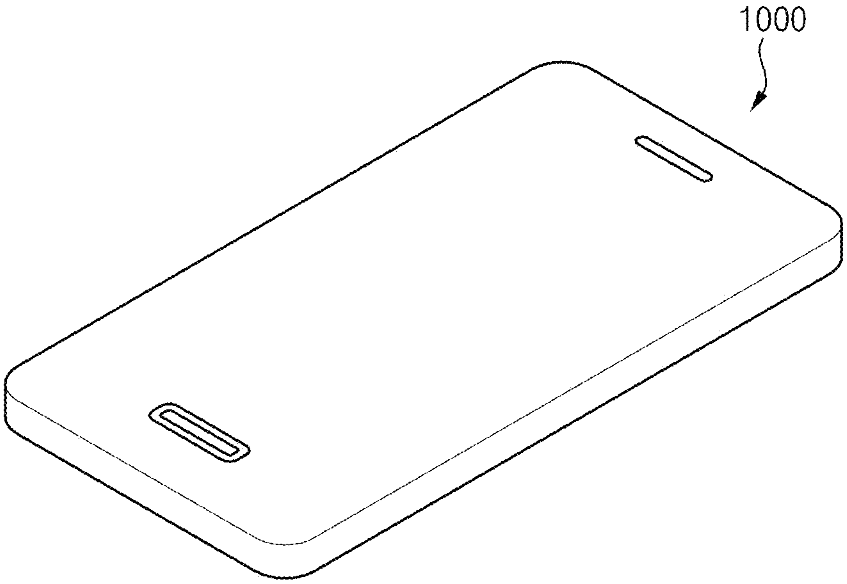
FIG. 16 is a diagram illustrating an example in which the electronic apparatus of FIG. 15 is implemented as a smart phone.

FIG. 15 is a block diagram illustrating an electronic apparatus 1000 according to an embodiment of the present inventive concept. FIG. 16 is a diagram illustrating an example in which the electronic apparatus 1000 of FIG. 15 is implemented as a smart phone.

Referring to FIGS. 1 to 16, the electronic apparatus 1000 may include a processor 1010, a memory device 1020, a storage device 1030, an input/output (I/O) device 1040, a power supply 1050, and a display apparatus 1060. Here, the display apparatus 1060 may be the display apparatus of FIG. 1. In addition, the electronic apparatus 1000 may further include a plurality of ports for communicating with a video card, a sound card, a memory card, a universal serial bus (USB) device, other electronic apparatuses, etc.

In an embodiment, as illustrated in FIG. 16, the electronic apparatus 1000 may be implemented as a smart phone. However, the electronic apparatus 1000 is not limited thereto. For example, the electronic apparatus 1000 may be implemented as a cellular phone, a video phone, a smart pad, a smart watch, a tablet PC, a car navigation system, a computer monitor, a laptop, a head mounted display (HMD) device, and the like.

The processor 1010 may perform various computing functions or various tasks. The processor 1010 may be a micro-processor, a central processing unit (CPU), an application processor (AP), and the like. The processor 1010 may be coupled to other components via an address bus, a control bus, a data bus, etc. Further, the processor 1010 may be coupled to an extended bus such as a peripheral component interconnection (PCI) bus.

The processor 1010 may output the input image data IMG and the input control signal CONT to the driving controller 200 of FIG. 1.

The memory device 1020 may store data for operations of the electronic apparatus 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like.

The storage device 1030 may include a solid state drive (SSD) device, a hard disk drive (HDD) device, a CD-ROM device, and the like. The I/O device 1040 may include an input device such as a keyboard, a keypad, a mouse device, a touch-pad, a touch-screen, and the like and an output device such as a printer, a speaker, and the like. In some embodiments, the display apparatus 1060 may be included in the I/O device 1040. The power supply 1050 may provide power for operations of the electronic apparatus 1000. The display apparatus 1060 may be coupled to other components via the buses or other communication links.

According to the compensation lookup table generator, the display apparatus including the compensation lookup table generator and the method of generating the compensation lookup table using the compensation lookup table generator of the present inventive concept as explained above, the luminance of the display panel may be increased and the display quality of the display panel may be enhanced.

The foregoing is illustrative of the present inventive concept and is not to be construed as limiting thereof. Although a few embodiments of the present inventive concept have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of the present inventive concept and is not to be construed as limited to the specific embodiments disclosed, and that modifications to the disclosed embodiments, as well as other embodiments, are intended to be included within the scope of the appended claims. The present inventive concept is defined by the following claims, with equivalents of the claims to be included therein.

What is claimed is:

1. A compensation lookup table generator comprising:

a maximum power voltage determiner configured to determine a maximum power voltage based on a first lookup table, a peak gain setting value and a power voltage curve;

a rush power reduction amount operator configured to operate a rush power reduction amount based on the maximum power voltage and a rush power limit;

an allowable current increase amount operator configured to operate an allowable current increase amount based on the maximum power voltage and the rush power reduction amount; and a lookup table modifier configured to generate a second lookup table by modifying the first lookup table based on the peak gain setting value and the allowable current increase amount.

2. The compensation lookup table generator of claim 1, wherein the first lookup table includes a luminance or a scale factor according to a load of input image data.

3. The compensation lookup table generator of claim 1, wherein the peak gain setting value is a maximum value, and the first lookup table is the same as the second lookup table.

4. The compensation lookup table generator of claim 1, wherein the peak gain setting value is less than a maximum value, and a scale factor of the second lookup table is greater than a scale factor of the first lookup table for a load greater than a scale factor maintaining load.

5. The compensation lookup table generator of claim 1, wherein the power voltage curve includes a power voltage according to a maximum grayscale value of input image data and a load of the input image data.

6. The compensation lookup table generator of claim 5, wherein as the peak gain setting value decreases, the maximum power voltage determined by the maximum power voltage generator decreases.

7. The compensation lookup table generator of claim 1, wherein the rush power is determined as a multiplication of (the rush power limit+a first current constant) and (the maximum power voltage−a first voltage constant).

8. The compensation lookup table generator of claim 7, wherein the peak gain setting value is a maximum value, and the rush power reduction amount operator is configured to determine the rush power reduction amount by subtracting a rush power of the peak gain setting value from a rush power.

9. The compensation lookup table generator of claim 1, wherein the allowable current increase amount operator is configured to determine the allowable current increase amount by dividing the rush power reduction amount by the maximum power voltage.

10. The compensation lookup table generator of claim 9, wherein the peak gain setting value is a maximum value, and the allowable current increase amount is zero, and wherein as the peak gain setting value decreases, the allowable current increase amount increases.

11. A display apparatus comprising:

a display panel; and a display panel driver configured to drive the display panel, wherein the display panel driver comprises a compensation lookup table generator, and wherein the compensation lookup table generator comprises:

a maximum power voltage determiner configured to determine a maximum power voltage based on a first lookup table, a peak gain setting value and a power voltage curve;

a rush power reduction amount operator configured to operate a rush power reduction amount based on the maximum power voltage and a rush power limit;

an allowable current increase amount operator configured to operate an allowable current increase amount based on the maximum power voltage and the rush power reduction amount; and a lookup table modifier configured to generate a second lookup table by modifying the first lookup table based on the peak gain setting value and the allowable current increase amount.

12. The display apparatus of claim 11, further comprising:

a driving controller configured to generate compensated image data by compensating input image data based on the second lookup table and to generate a data signal based on the compensated image data; and a data driver configured to convert the data signal to a data voltage and to output the data voltage to the display panel.

13. The display apparatus of claim 12, wherein the driving controller comprises:

a load calculator configured to calculate a load of the input image data;

a scale factor generator configured to generate a scale factor based on the load of the input image data and the second lookup table; and a scale factor applier configured to apply the scale factor to the input image data to generate the compensated image data.

14. The display apparatus of claim 12, wherein the display panel driver further comprises:

a load determiner configured to determine a load of the compensated image data;

a maximum grayscale value determiner configured to determine a maximum grayscale value of the compensated image data;

a voltage determiner configured to determine a voltage level of a power voltage based on the load of the compensated image data and the maximum grayscale value of the compensated image data; and a voltage generator configured to generate the power voltage based on the voltage level.

15. The display apparatus of claim 14, wherein the display panel driver further comprises a power voltage generator configured to generate the power voltage based on the compensated image data and to output the power voltage to the display panel, wherein the driving controller comprises the load determiner, the maximum grayscale value determiner and the voltage determiner, and wherein the power voltage generator comprises the voltage generator.

16. The display apparatus of claim 14, wherein the display panel driver further comprises a power voltage generator configured to generate the power voltage based on the compensated image data and to output the power voltage to the display panel, wherein the driving controller comprises the load determiner and the maximum grayscale value determiner, and wherein the power voltage generator comprises the voltage determiner and the voltage generator.

17. The display apparatus of claim 14, wherein the display panel driver further comprises a power voltage generator configured to generate the power voltage based on the compensated image data and to output the power voltage to the display panel, and wherein the power voltage generator comprises the load determiner, the maximum grayscale value determiner, the voltage determiner and the voltage generator.

18. The display apparatus of claim 11, further comprising a lookup table setter configured to output the first lookup table and the peak gain setting value to the maximum power voltage determiner and the lookup table modifier.

19. The display apparatus of claim 11, further comprising a power voltage curve setter configured to output the power voltage curve to the maximum power voltage determiner.

20. The display apparatus of claim 11, wherein the peak gain setting value is a maximum value, and the first lookup table is the same as the second lookup table.

21. The display apparatus of claim 11, wherein the peak gain setting value is less than a maximum value, and a scale factor of the second lookup table is greater than a scale factor of the first lookup table for a load greater than a scale factor maintaining load.

22. A method of generating a compensation lookup table, the method comprising:

determining a maximum power voltage based on a first lookup table, a peak gain setting value and a power voltage curve;

operating a rush power reduction amount based on the maximum power voltage and a rush power limit;

operating an allowable current increase amount based on the maximum power voltage and the rush power reduction amount; and generating a second lookup table by modifying the first lookup table based on the peak gain setting value and the allowable current increase amount.

* * * * *